Sept. 5, 1967 K. F. TRAGER 3,340,166
ELECTROCHEMICAL TREPANNING PROCESS AND
APPARATUS TO ACCOMPLISH THE SAME
Filed March 13, 1967 3 Sheets-Sheet 1

INVENTOR
KEMPES F. TRAGER
BY
James H. Bower
ATTORNEY

Sept. 5, 1967    K. F. TRAGER    3,340,166
ELECTROCHEMICAL TREPANNING PROCESS AND
APPARATUS TO ACCOMPLISH THE SAME
Filed March 13, 1967    3 Sheets-Sheet 2
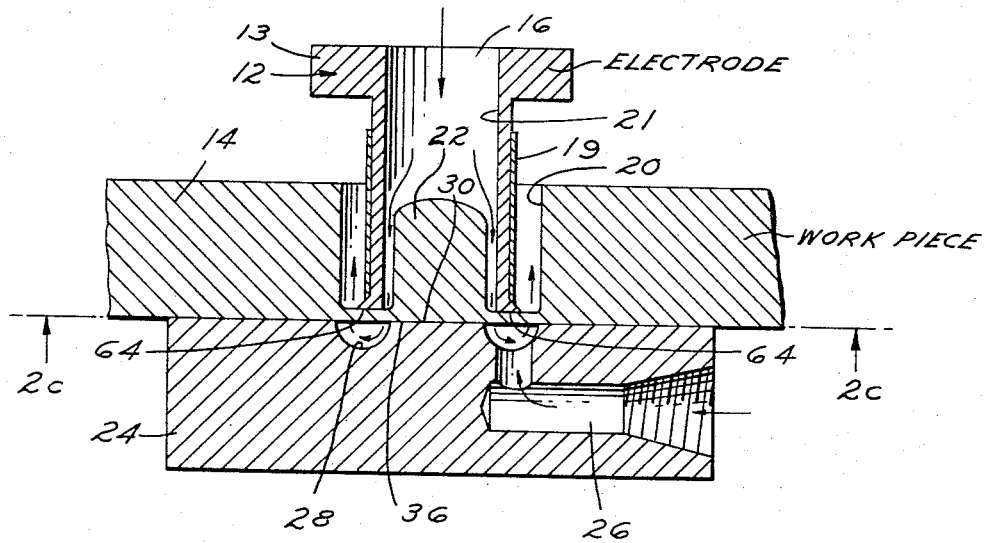
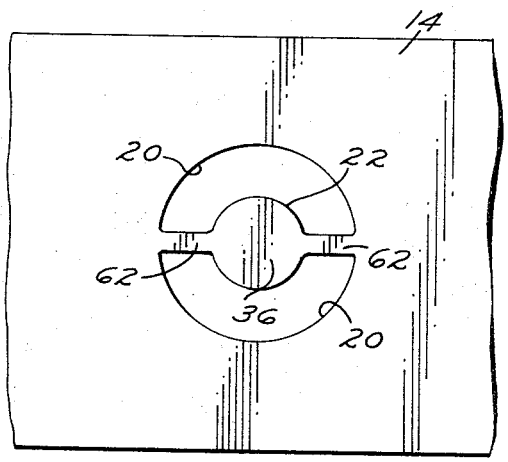
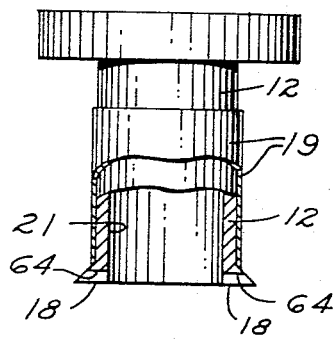
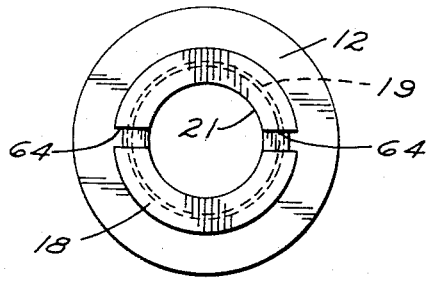
INVENTOR
KEMPES F. TRAGER
BY
James H. Bower
ATTORNEY

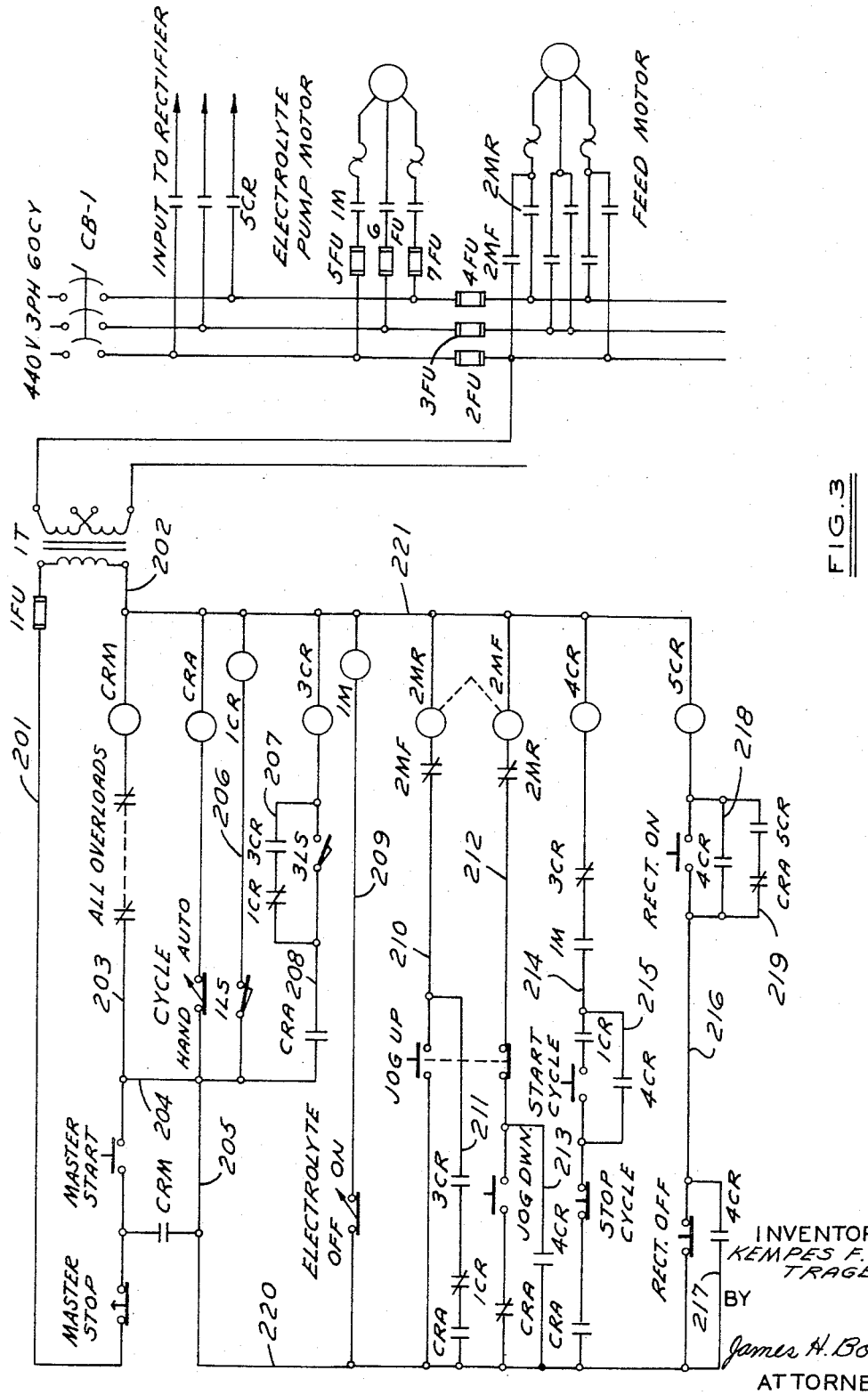

United States Patent Office 3,340,166
Patented Sept. 5, 1967

3,340,166
ELECTROCHEMICAL TREPANNING PROCESS AND APPARATUS TO ACCOMPLISH THE SAME
Kempes F. Trager, Detroit, Mich., assignor to Ex-Cell-O Corporation
Filed Mar. 13, 1967, Ser. No. 622,543
2 Claims. (Cl. 204—143)

ABSTRACT OF THE DISCLOSURE

An electrochemical machining apparatus having a hollow electrode tool with a recessed notch formed on its tool working face so that the metal slug eroded from the workpiece is permitted to remain integral with the workpiece and held thereby.

---

This application is a continuation-in-part of application Ser. No. 563,232, filed July 6, 1966, now Patent No. 3,330,754, issued July 11, 1967, which application is a continuation-in-part of application Ser. No. 249,906, filed Jan. 7, 1963, now abandoned, and this application is further copending with application Ser. No. 622,814, filed Mar. 13, 1967.

This invention relates in general to electrochemical machining, and particularly to methods for successfully performing electrochemical trepanning operations. Electrochemical machining of metalloids, sometimes called electrolytic machining, is coming into extensive use because of its ability: to machine any conductive metalloid; to machine metalloids that are not readily machinable by ordinary methods or conventional cutting tools, while still obtaining substantially high surface finish free from burrs; to produce articles free of residual stresses and metallurgical charges; and to machine three-dimensional shapes with a single-axis movement.

It is now well known that electrochemical machining consists in advancing an electrode tool toward and into a workpiece while electrolyte is supplied under pressure to the interface between the working face of the electrode tool and the workpiece. A direct current source of low potential but high amperage capacity is connected to the electrode and the workpiece in a sense to make the electrode a cathode and the workpiece an anode. The electrolyte action thus produced rapidly removes material from the anodic workpiece in front of the advancing electrode tool.

Among the major utilizations of electrochemical machining are trepanning operations, that is, the sinking of a cylindrical or irregular shaped cavity by means of a hollow thin-walled electrode in such a way that a core or slug of workpiece material is severed when the hollow tool traverses all the way through the workpiece. This core or slug of metalloid may or may not be the finished article.

The possibility of a damaging short circuit between the cathodic tool and the anodic workpiece exists in all electrochemical operations, but especially in electrochemical trepanning operations. A short circuit can occur when a hollow electrode breaks partially through the remote side of a workpiece, permitting the electrolyte to flow suddenly through the workpiece and creating an electrolyte shortage or starvation at the gap between the electrode tool face and the remaining metal in the cavity. Consequently, the electrode tool advances at a faster rate than the metal can be eroded away from the workpiece, causing a short circuit when contact is made between the electrode tool face and the workpiece. Also a short circuit can occur when the electrode breaks partially through the remote side of a workpiece, allowing the partly severed slug or core to be cocked against an interior surface of the hollow electrode resulting in a short circuit at that point. These problems are solved by the present invention by the means hereinafter described.

An object of the invention, therefore, is to provide method and apparatus to prevent short circuits in electrochemical trepanning operations.

Another object of the invention is to provide for more efficient metal removal as a trepanning electrode tool emerges through a hole in a workpiece.

A further object of the invention is to provide methods and apparatus for preventing a slug obtained by electrochemical trepanning of a workpiece from becoming dislodged and thereby interfering with the machining process and causing a short circuit.

Various other objects and advantages will appear from the following description of several embodiments of the invention, and the novel features will be particularly pointed out hereinafter in connection with the appended claims.

Although the invention is disclosed as it pertains to electrochemical machining, it will be obvious to those learned in the art that the methods and apparatus herein described can be easily adapted to solve similar problems in trepanning operations by means of electrical discharge machining, sometimes called spark machining.

In the drawings, wherein like numerals refer to like or equivalent elements:

FIGURE 2 is an example of structural embodiment of the present invention shown in a schematic sectional view;

FIGURE 2a is an elevational view of the electrode tool utilized in the embodiment of FIGURE 2;

FIGURE 2b is a bottom view of the electrode tool shown in FIGURE 2a;

FIGURE 2c is a partial plan view of a completed workpiece obtained by means of the apparatus illustrated in FIGURE 2;

FIGURE 3 is a schematic representation of a portion of the control circuitry for the structure illustrated in FIG. 1.

Figure 1:
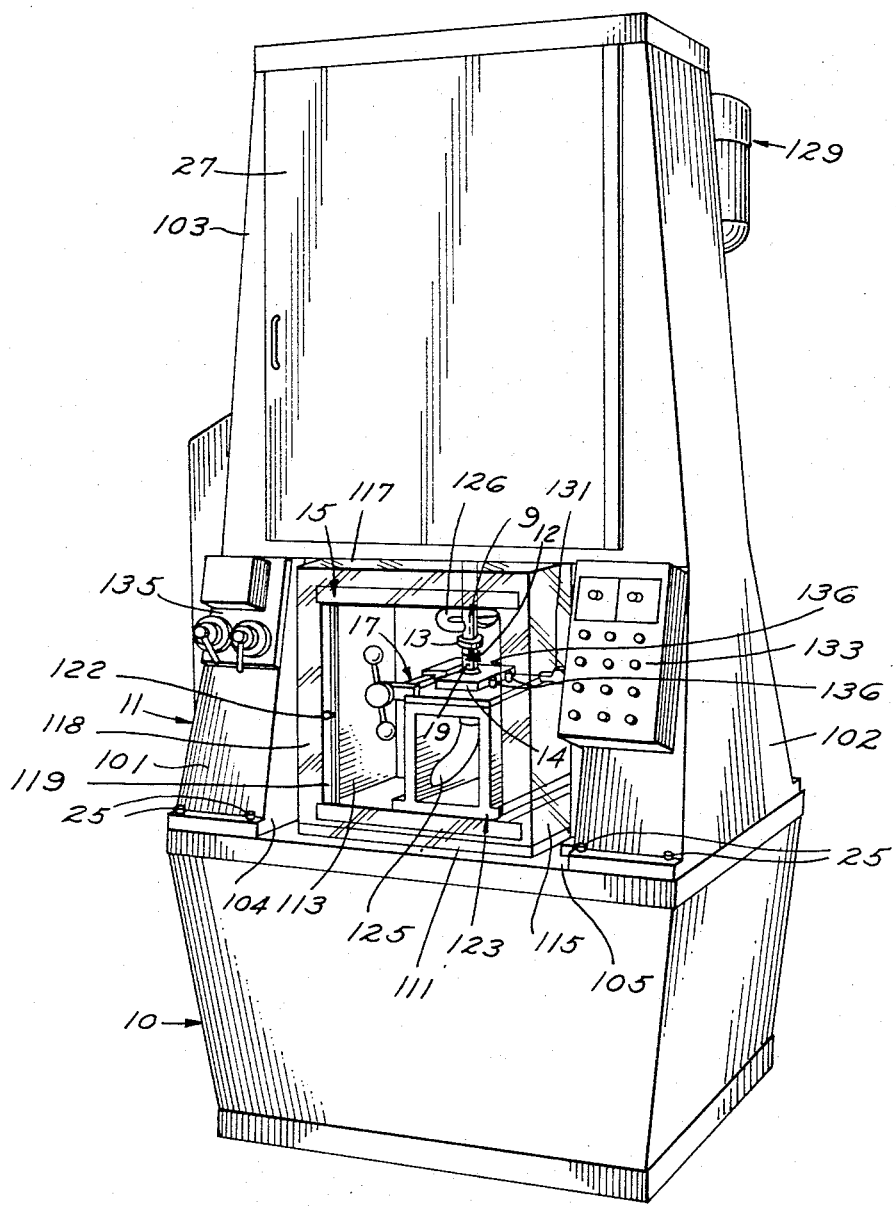
FIGURE 1 is a front perspective view of an electrochemical machining apparatus.

FIGURE 1 shows a perspective view of an illustrative embodiment which comprises a hollow base, generally indicated by the numeral 10, on which is mounted a column generally indicated by the numeral 11. The numeral 9 generally indicates a head or ram assembly and consists of an electrode tool 12 connected to the ram assembly by a flange collar 13, as shown in the illustrative embodiment. The tool member 12 extends downwardly into operative engagement with the workpiece 14 held in the workpiece fixture 17 that is disposed in a transparent fixture enclosure 15.

As shown in FIG. 1, the machine column 11 includes the lower spaced apart hollow legs or supports 101 and 102 which form compartments for housing a part of the operating structure of the machine. The numeral 103 indicates the upper end of the column 11 which is integral with the legs 101 and 102 and which encloses the upper end of the area between legs 101 and 102 to form a passageway 104 in which is seated the fixture enclosure 15. The upper end of the base 10 encloses the lower end of the passageway 104. It will be seen that this structure permits the machine to be set up for production line operation whereby workpieces may be moved into and out of the workpiece fixture by suitable work transfer means. As shown, the legs 101 and 102 are secured to the base 10 by any suitable means as by the screws 25. The upper end of the column 11 is provided with the compartment in which is mounted the head assembly. The compartment is enclosed on the front side thereof by the hingedly mounted door 27.

The fixture enclosure 15 is provided with a bottom plastic wall 111 which is seated on the top wall portion of the base 10. The enclosure 15 includes the side walls 113 and 115 which are connected to a rear wall not shown, the top wall 117 and the bottom wall 111 by any suitable means, as by a suitable adhesive. The front end of the enclosure 15 is provided with the integral peripheral flange 118 around an access opening adapted to be closed by the sliding door 119. The door 119 is provided with a knob 122 for manually sliding the door to the left as viewed in FIG. 1 through the opened position. The door 119 is adapted to be slidably mounted on tracks which extend along the left side wall 113 of the enclosure 15. The enclosure 15 is preferably made from plastic to permit inspection of the workpiece and tool during the operation.

The workpiece fixture 17 is mounted on the pedestal 123 which is secured to the surface portion 105 of the base 10. The fixture 17 is supported on the pedestal 123 to clamp the workpiece against the pins or abutting means 136. The illustrative workpiece fixture is adapted to hold any workpiece in a rigid position while a bore is formed therethrough. It will be understood that the form of the fixture will be dictated by the workpiece which is to be machined. A hose 125 is provided for conducting electrolyte to the backup member 24 as shown in FIG. 2, the purpose of which is to be explained hereinafter. A second hose 126 is provided for conducting electrolyte to the tool 12 through the passage 16 shown in FIG. 2.

The drive unit 129 is supported on the rear side of the column portion by any suitable means. The drive unit may include any suitable drive motor and provides the motor power for raising and lowering the tool. The means for raising and lowering the shaft on which the tool is placed is accomplished by any suitable combination gear reduction means not shown but well known in the art.

The tool is provided with connections to the negative terminal of a suitable D.C. power supply, not shown. The D.C. current circuit is completed from the positive terminal of the power supply to the workpiece by means of a cable connection 131. It will be seen that the tool is negative and the workpiece along with its fixture is positive. The D.C. current is passed through to the workpiece 14 for purposes of machining.

Panel 133 is provided with proper switches and buttons to provide control of the machining operations. Panel 135 is provided with regulating valves for controlling the flow of electrolyte.

Referring now to FIGURE 2 thereof, in the course of a typical trepanning operation by electrochemical process a hollow electrode tool 12 electrically connected to the negative terminal of direct current source by appropriate means (not shown) is advanced slowly into a workpiece 14, connected to the positive terminal of the current source by appropriate conductors (not shown) while electrolyte is forced under high pressure through a passageway 16 in the hollow electrode tool. The electrolyte is thus caused to flow across the interface between the advancing working face 18 of the electrode tool and the receding corresponding surface of the workpiece being eroded away by the electrochemical process.

The electrode tool is preferably coated on its outside surface with an adhering film 19 of a material which is a good electrical insulator to prevent electrolysis of the side walls 20 of the cavity being formed in the workpiece, according to a technique which is well known to the art. When it is desired to prevent electrolysis of the slug, the inner surface 21 of the electrode tool may also be coated in a similar manner.

When the electrode tool 12 has penetrated the workpiece to the position illustrated in FIGURE 2, a slug or core 22 is caused to be severed from the workpiece. In most instances, the slug is not separated from the workpiece all at once, and some portions of the bottom of the workpiece cavity are eroded away first, affording an escape passage for the electrolyte and causing a drop of electrolyte pressure and electrolyte starvation at the interface. Due to this electrolyte starvation at the interface, the workpiece cavity is not eroded at as fast a rate as the electrode tool is advancing and a short circuit occurs when the two make contact.

To prevent this from occurring, a back-up member 24 is disposed under the workpiece 14, as shown in the drawing, and electrolyte under pressure is supplied, by means of a passageway 26, to a clearance recess 28, on the back-up member 24, the shape of the recess corresponding to the shape of the electrode tool working face 18. Thus, there will be an adequate supply of electrolyte to the remaining interface when the electrode tool has broken partially through the bottom of the workpiece.

The clearance recess 28 surrounds an area 30 of the back-up member which corresponds to and forms a support for the underface 36 of the slug 22.

The slug is maintained in its proper orientation at the critical point of a trepanning operation. This embodiment of the invention makes use of small support ribs or bridges 62 of metal left between the slug and the workpiece when the trepanning operation is completed. The electrode tool 12, as shown in elevation in FIGURE 2a and in the bottom view in FIGURE 2b, has several small recessed notches 64 provided around the electrode working face 18 so that, when the electrode has broken through the remote side of the workpiece, several small support ribs 62 corresponding to notches 64 will remain between the slug and workpiece. The workpiece with the slug still in its original position, as shown in FIGURE 2c, is removed from the fixture and the slug and support ribs are knocked out with light hammer blows. This method is readily adaptable to the machining of irregular and complicated shapes in any metalloid material, is very simple, and requires little or no extra tooling expense.

It can be seen that in the working of the process by the means of FIGURES 2–2c, the back-up member may be omitted as the support ribs or bridges 62 afford sufficient support for the slug 22.

Controlled circuitry for the machine shown in FIGURE 1 is illustrated in FIGURE 3. The power supply is provided through a 440 volt, 3 phase, 60 cycle line and goes through an ordinary circuit breaker and provides an input to the rectifier, another input to the electrolyte pump motor and a third input to the feed motor. The input to the electrolyte pump motor is protected by fuses 5FU, 6FU and 7FU. The electrolyte pump motor is operative through contacts 1M only when the coil 1M is energized. The feed motor is similarly protected by means of fuses 2FU, 3FU and 4FU and operative only when contact 2MF or 2MR are closed, in a manner as will be hereinafter disclosed. The rectifier is operative when coil 5CR is energized.

Assuming that the operational cycle is now initiated with the circuit breaker engaged to thus provide power to the transformer 1T and thereby provide a conventional flow of electrical power to conductors 201 and 202. A fuse 1FU protects the lines 201 and 202 from excessive surges of electrical power.

The operational cycle is initiated with the tool 12 fully raised or in the uppermost position. Pressing the Master Start button provides for flow of electrical power into line 203 to energize coil CRM. Erengizing coil CRM closes normally-open contacts CRM between lines 203 and 205. Electrical power transmitted through transformer 1T flows through line 201 through the Master Stop button, through the now closed contact CRM to line 205 and back through lines 204 and 203 to maintain or hold the coil CRM energized. With the flow of power going through the Master Stop button and now closed contact CRM, line 220 is electrically conductive. With the Electrolyte switch placed in the ON position, electrical power from line 220 flows in line 209 and energizes coil 1M. Energizing coil 1M closes contacts 1M of the Electrolyte Pump Motor shown to the right of FIG. 3. Closing of contacts 1M causes electrical power to energize the pump motor for flow of electrolyte to the tool 12.

The operating mode of this machine will be first described in the AUTO or automatic cycle. The flow of electrical power in line 205 goes through the Cycle switch and energizes coil CRA. Energizing the coil CRA closes the normally-open contacts CRA in line 208. With the tool in the retracted position, which would be considered the start cycle position, the limit switch 1LS is closed thus electrical power flows in line 206 to energize coil 1CR. Energization of coil 1CR opens the normally-closed contacts 1CR in line 207 thereby preventing the flow of electrical power to energize coil 3CR unless limit switch 3LS is closed.

The operational cycle is initiated when the Start Cycle button on line 214 is pushed, thereby providing a flow of electrical power through the now closed contacts CRA, the closed contacts of Stop Cycle button, the now closed contacts of the Start Cycle button, the now closed contacts of 1CR, the now closed contacts of 1M, and finally through the normally-closed contacts of 3CR to energize coil 4CR.

Energization of coil 4CR on line 214 closes contacts 4CR on line 215 to maintain energization of coil 4CR. To deenergize the coil 4CR, the Stop Cycle button has to be pressed dropping out the coil 4CR and stopping further operation of the machine. Closing of the contacts 4CR in lines 217 and 218 when the Start Cycle button is depressed provides for flow of electrical power to line 216 to energize coil 5CR. Energization of coil 5CR closes contacts 5CR shown to the right of FIG. 3. Closing of the contacts 5CR causes electrical power to flow to the rectifier. Simultaneously, the energization of coil 4CR closes contacts 4CR on line 213 thereby causing electrical power to flow in line 212 through the closed contacts of the Jog Up button, through the normally-closed contacts 2MR to energize coil 2MF. Energizing coil 2MF closes the contacts 2MF of the Feed Motor and causes the motor to rotate forward to move the tool 12 shown in FIG. 2 downward. As the tool starts down, the limit switch 1LS on line 206 opens thereby de-energizing the coil 1CR. De-energizing of coil 1CR closes the contacts 1CR in line 207. When the tool reaches its lowermost position, limit switch 3LS on line 208 closes thereby energizing coil 3CR. Energization of coil 3CR closes contacts 3CR in line 211. Simultaneously, the closed contacts 3CR on line 214 are opened thereby de-energizing coil 4CR. De-energization of coil 4CR opens the contacts 4CR on line 213 thereby preventing energization of coil 2MF. De-energization of coil 2MF ceases the rotation of the Feed Motor, and simultaneously closes the contacts 2MF on line 210. Electrical power now flows from line 220, through line 211 by means of closed contacts CRA, normally closed contacts 1CR, and now closed contacts of 3CR, through line 210 by means of now closed contacts 2MF to energize coil 2MR. Energization of coil 2MR closes contacts 2MR of Feed Motor to thereby immediately reverse the rotation of the motor and cause the tool to retract. Closing of the limit switch 3LS provides for energization of the coil 3CR in line 208. Energization of the coil 3CR in line 208 closes the contacts in line 207 maintaining energization of coil 3CR, even though limit switch 3LS is opened when the tool begins to retract. This maintains the rotation of the feed motor in the reverse or upward direction until the tool reaches its uppermost position. As soon as the tool reaches its uppermost limit the contacts of limit switch 1LS are closed thereby energizing the coil 1CR of line 206. Energization of coil 1CR opens the contacts 1CR on line 207 and prevents further electrical flow to energize coil 3CR and 3CR drops out or de-energizes. De-energization of coil 3CR opens the contacts 3CR on line 211 and stops further energization of 2MR which ceases rotation of the feed motor. The tool remains in its uppermost position or fully retracted position until the Start Cycle button is depressed on line 214 thereby energizing coil 4CR.

Energizing coil 4CR causes the forward rotation of the feed motor in the manner described above.

When it is desired to operate the machine in a manual mode of operation, the switch in line 205 is turned to HAND and thereafter all operations are not automatic but are manual. The Jog Down on line 212 and the Jog Up on line 210 will depend on the operator making all of the necessary operations to cause the machine to go down or up. The rectifier is put in operation by pressing the Rect. On button in line 216 which causes electrical power to flow through line 216 to energize coil 5CR. Energizing coil 5CR closes contact 5CR in line 219. Since the contacts CRA in line 219 are normally closed, closing of contacts 5CR provides a by-pass to maintain coil 5CR in the energized position at all times, unless the Rect. Off button is pushed thereby preventing electrical power to flow in line 216.

It is seen from the methods and apparatus heretofore described, that the problem of short-circuits in electrochemical trepanning operations has been solved by the use, when necessary, of a recess and pressurized electrolyte supply in the back-up member, and by the use of means to hold the slug in its original position after the electrode breaks through the remote side of the workpiece.

It will be understood that the directions and orientations, such as up or down, top or bottom, mentioned in the above description refer only to the attached drawings and will not necessarily be the same in actual application of the invention.

It will also be understood that various changes in the details, materials, steps, and arrangements of parts, which have been herein described and illustrated in order to explain the nature of the invention, may be made by those skilled in the art within the principle and scope of the invention as expressed in the appended claims.

What is claimed is:

1. In the process of electrolytically trepanning an electrochemically erodible workpiece by means of passing current between a hollow electrode tool and said workpiece, said electrode tool having a conductive working face and at least one electrolyte passage therethrough for supplying electrolyte under pressure to said working face, the improvement in the method comprising the steps of:
   (a) moving the electrode tool relative to the workpiece in such a way as to define a narrow gap between said electrode tool working face and said workpiece wherein a slug of non-eroded workpiece material is adapted to be served from said workpiece;
   (b) flowing an electrolyte fluid under pressure through said hollow electrode tool;
   (c) providing a back-up member for said workpiece; said back-up member having a recessed area substantially conforming to the shape of said electrode tool working face, and wherein said recess is adapted to be in contact with at least a portion of said slug;
   (d) means for holding said slug when said electrode tool has penetrated through said workpiece and emerges therefrom in the recessed area of said back-up member;
   (e) providing said electrode tool working face with at least one recessed notch;
   (f) advancing said electrode tool all the way through the workpiece sufficiently to cause said electrode tool working face to emerge from said workpiece; and
   (g) stopping the advance of said electrode tool as soon as its working face emerges from said workpiece to cause said slug to remain attached to said workpiece by a connecting portion corresponding to said recessed notch.

2. In an electrochemical trepanning apparatus including means for holding a workpiece, an electrode tool for trepanning said workpiece, said electrode tool having a working face at one end thereof, means for advancing said electrode tool relative to the workpiece and for maintaining a gap therebetween, means for rapidly circulating an electrolyte through said gap, and a source of electric current electrically connected to the workpiece and said electrode tool to make said workpiece predominantly an anode and said tool predominantly a cathode, the improvement wherein said electrode tool is hollow to provide at least one electrolyte passage therethrough for supplying electrolyte under pressure to said gap and the working face thereof is notched completely thereacross; said means for holding the workpiece includes a back-up member for supporting said workpiece and having a recessed area thereon substantially conforming to the shape of said electrode tool working face, said recessed area adapted to be in contact with at least a portion of said workpiece cut away by said electrode tool; and said means for advancing said electrode includes means for stopping the advance of said electrode tool as soon as its working face emerges from said workpiece to cause said slug to remain attached to said workpiece by a connecting portion corresponding to said recessed notch.

References Cited

UNITED STATES PATENTS

| | | | |
|---|---|---|---|
| 3,058,895 | 11/1962 | Williams | 204—143 |
| 3,137,645 | 6/1964 | Vaughn et al. | 204—206 |

JOHN H. MACK, *Primary Examiner.*

ROBERT K. MIHALEK, *Examiner.*